United States Patent [19]

Genovese

[11] Patent Number: 4,583,361
[45] Date of Patent: Apr. 22, 1986

[54] HEATER PROTECTION OF THRUSTERS

[75] Inventor: Joseph E. Genovese, East Granby, Conn.

[73] Assignee: United Technologies Corporation, Hartford, Conn.

[21] Appl. No.: 557,556

[22] Filed: Dec. 2, 1983

[51] Int. Cl.⁴ .......................... F02C 3/20; F02C 7/26; F24H 3/00

[52] U.S. Cl. ............................. 60/39.462; 60/39.822; 165/47

[58] Field of Search ............... 60/203, 39.462, 39.822; 165/47; 60/300

[56] References Cited

U.S. PATENT DOCUMENTS

| | | |
|---|---|---|
| 3,719,046 | 3/1973 | Sutherland et al. ................. 60/206 |
| 4,107,922 | 8/1978 | Wossner ............................. 60/300 |
| 4,169,351 | 10/1979 | Barber ............................... 60/203 |
| 4,211,072 | 7/1980 | Twardy et al. ...................... 60/203 |
| 4,288,982 | 9/1981 | Kuezly et al. ...................... 60/200.1 |
| 4,322,946 | 4/1982 | Murch et al. ....................... 60/203.1 |
| 4,324,096 | 4/1982 | Ellion ................................ 60/218 |
| 4,377,198 | 3/1983 | Welling et al. .................. 165/104.33 |

Primary Examiner—J. Casaregola
Assistant Examiner—Timothy S. Thorpe
Attorney, Agent, or Firm—John Swiatocha

[57] ABSTRACT

A thruster (10) including a heater (65) remote from the location of propellant decomposition, includes a means such as a thermal diode heat pipe for conducting heat unidirectionally, from the heater to the decomposition location, extending the useful life of the thruster.

3 Claims, 1 Drawing Figure

U.S. Patent     Apr. 22, 1986     4,583,361
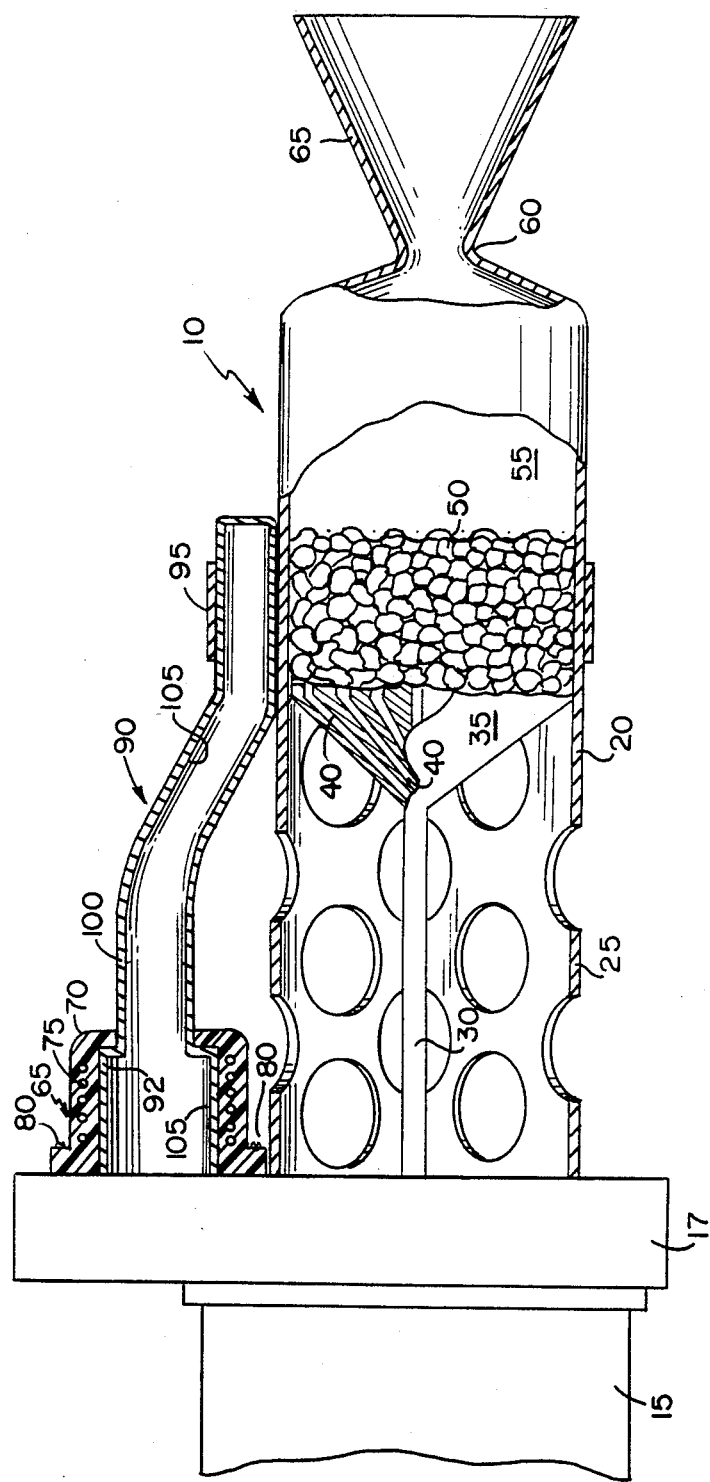

HEATER PROTECTION OF THRUSTERS

DESCRIPTION

1. Technical Field

This invention relates to thrusters (small rocket motors) and more particularly to thrusters operating with a propellant which is decomposed in the thruster by a heated catalyst.

2. Background Art

Low thrust rocket engines (thrusters) are employed by most spacecraft to control the spacecraft's direction and velocity and to control the attitude of the spacecraft with respect to the earth or any other reference frame. Conventional thrusters employ a propellant such as hydrazine ($N_2H_4$) which is decomposed into a gaseous state in a catalyst bed, the gases then being exhausted from the thruster through a nozzle. To enhance the initiation of the decomposition of the propellant in the catalyst bed, it has been the practice to heat the bed typically to a temperature of 100°–300° F. by electric heaters located in the bed, adjacent thereto or otherwise proximally thereto. Inasmuch as decomposition of the propellant is an exothermic reaction, firing the thruster typically heats the bed to temperatures in the range of 1500°–1700° F. Thus, it will be appreciated that repeated firings of a thruster repeatedly expose the catalyst bed heater to the extreme temperatures associated with decomposition of the propellant, thereby reducing the useful life of the catalyst bed heater and thus, the thruster itself.

DISCLOSURE OF INVENTION

It is therefore, among the principal objects of the present invention, to provide a means for protecting a thruster heater from the extreme temperatures associated with the decomposition of propellant within the thruster.

In accordance with the present invention, in a thruster in which propellant decomposition in a chamber is initiated at least in part by a heater, the heater is located distally from the chamber and connected thereto by a means for transporting heat unidirectionally from the heater to the chamber, whereby heat given off in the chamber by the decomposition of the propellant, is blocked from the heater thereby prolonging the life of the heater and the thruster itself. In the preferred embodiment, the thruster is of the type employing a heated catalyst bed for the decomposition of the propellant, the catalyst bed being connected to the heater by a thermal diode heat pipe which conducts heat from the heater to the catalyst bed during dormant periods. When the thruster is fired, that portion of the heat pipe adjacent the chamber dries out to block the transfer of heat from the chamber back to the heater. The heater protection afforded by the present invention is useful with thrusters employing hydrazine or other single or multiple component propellants requiring heat for the initiation and/or maintenance of propellant decomposition.

BRIEF DESCRIPTION OF DRAWING

The sole FIGURE is an elevation in partial section of a thruster employing the heater protection associated with the present invention.

BEST MODE FOR CARRYING OUT THE INVENTION AND INDUSTRIAL APPLICABILITY THEREOF

Referring to the drawing, there is shown a thruster indicated generally at 10 which is provided with propellant such as hydrazine from a suitable reservoir thereof (not shown), the supply of propellant to the thruster being controlled by any suitable valving (not shown) and the reservoir and valving being disposed within housing 15. The thruster is mounted on base 17 and comprises a housing 20 in part defining an apertured barrier tube 25 which dissipates much of the heat of decomposition of the propellant before such heat is conducted back to housing 15. An injector tube 30 which connects with the propellant control valve interiorly of housing 15, extends through barrier tube 25 and terminates in a propellant injector (distribution head) 35 provided with a plurality of conduits 40 through which propellant is ducted to a bed 40 accommodating therein a catalyst 45 such as Shell ®405 in granular form. The catalyst bed is defined by the lateral wall of housing 20, by distribution head 35, and by a screen 50 disposed opposite the distribution head. As those skilled in the art will readily appreciate, propellant injected into the catalyst bed is decomposed therein into a gaseous state, the gases being expelled from the catalyst bed through screen 50 which, with the right-hand portion of housing 20, defines a chamber 55 in which the gaseous products of decomposition of the propellant are expanded. From the decomposition chamber, the gases pass through restrictor 60 formed in the end of housing 20 and finally through an exhaust nozzle 65, which, as shown herein, may be formed integrally with the housing.

As set forth hereinabove, to enhance the initiation of the decomposition of the propellant within the catalyst bed, it has been the practice to provide a heater such as battery-powered electrical heater at, adjacent to, or otherwise proximally to the catalyst bed. However, the extremely high temperatures associated with the decomposition of the propellant within the catalyst bed, subjects the heater mounted in such a way to extremely damaging heat flow thereto, thereby severely limiting the useful life of the heater and thus, the thruster itself. To minimize such damaging heat flow from the catalyst bed to the heater in the present invention the heater is located distally from the catalyst bed and connected thereto by a means for transporting heat unidirectionally from the heater to the catalyst bed. As illustrated, an electric heater 65 comprising a body portion 70 having an electric resistance coil 75 embedded therein is located on base 17, being attached thereto by screws or similar fasteners 80. The heater surrounds and restrains one end of a thermal diode heat pipe 90 fixed at the opposite end thereof proximally to catalyst bed 40 by a ring clamp 95 encircling both the end of heat pipe 90 and the adjacent portion of housing 20. Heat pipe 90 comprises an enlarged trap 92 and an integral, elongate tube 100, both the trap and the tube being lined with a suitable wicking material 105. A vaporizable heat transport fluid such as ammonia is absorbed within the wicking material.

In operation, during dormant periods, heater 65 is energized, thereby vaporizing the fluid within and adjacent to trap 92, the vapor flowing by convection to the opposite end of the heat pipe where it condenses, releasing the heat vaporization to the catalyst bed for maintenance of the bed at the desired temperature noted hereinabove. Thereafter, the condensate returns to the end of tube 100 nearest the trap by means of liquid wicking through material 105, the trap remaining dry. It will be seen then that during such dormant periods, the diode operates as an ordinary heat pipe, repeatedly vaporizing fluid in tube 100 adjacent trap 92 and condensing the vaporized fluid adjacent the catalyst bed with the attendant release of heat thereto. However, when the thruster is fired, the heater is deenergized and the end of tube 100 nearest the catalyst bed is heated to much higher temperatures than that of trap 92. Thus, the trap becomes the cold end of the heat pipe, and the liquid condenses within the trap, accumulating therein and causing the main heat pipe wick to quickly dry out, thereby preventing the transfer of heat from the catalyst chamber to the heater. The heat pipe ceases to function as a heat transporting means and, for the duration of the firing, acts as an insulator instead, thereby isolating the exothermic heat associated with thruster firing from the heater to preserve and thus extend the useful life of the heater and therefore the thruster.

While a particular embodiment of the present invention has been shown and described, it will be understood that various modifications of this invention will, from the disclosure herein, suggest themselves to those skilled in the art. For example, while a catalyst bed thruster has been shown, it will be understood that the invention herein is equally well suited for thrusters wherein heat alone is employed to decompose the propellant. In such case, the invention herein would serve to isolate the heater from the exothermic heat of propellant decomposition in the same manner as that described. Likewise, while a thermal diode heat pipe has been described as the means for transporting heat unidirectionally from the heater to the chamber in which the propellant is decomposed, it will be understood that various equivalent means for the unidirectional transport of heat from the heater to a remote location may be employed without departing from the present invention. It is the intention of the following claims to cover these and any other such modifications as will fall within the true spirit and scope of this invention.

Having thus described the invention, what is claimed is:

1. A thruster comprising a chamber for the decomposition of a propellant, means for injecting said propellant into said chamber and a nozzle for exhausting decomposed propellant from said chamber, said thruster being provided with a heater for heating said propellant to enhance the decomposition thereof and characterized by:

said heater being disposed distally from said chamber at a location substantially unheated thereby; and means connecting said heater with said chamber for transporting heat unidirectionally from said heater to said chamber, thereby minimizing the transport from said chamber to said heater of heat released by an exothermic decomposition of said propellant within said chamber.

2. The thruster of claim 1 characterized by said heat transporting means comprising a heat pipe.

3. The thruster of claim 1 characterized by said heat pipe comprising an elongate wick-lined tube having a radially enlarged wick-lined trap at an end thereof closest to said heater.

* * * * *